United States Patent [19]

Ferris et al.

[11] Patent Number: 4,588,355

[45] Date of Patent: May 13, 1986

[54] FLEXIBLE SWASHPLATE CENTERING MEMBER

[75] Inventors: Donald L. Ferris, Newtown; Michael J. Marchitto, Orange, both of Conn.

[73] Assignee: United Technologies Corporation, Hartford, Conn.

[21] Appl. No.: 644,000

[22] Filed: Aug. 23, 1984

[51] Int. Cl.$^4$ .................. B64C 27/35; B64C 27/605
[52] U.S. Cl. .................. 416/114; 416/134 A
[58] Field of Search ............ 416/114, 102, 148, 134 A

[56] References Cited

U.S. PATENT DOCUMENTS

| | | | |
|---|---|---|---|
| 2,396,038 | 3/1946 | Bossi | 416/114 X |
| 2,410,545 | 11/1946 | Main | 416/114 |
| 3,558,082 | 1/1971 | Bennie | 416/114 X |
| 3,933,324 | 1/1976 | Ostrowski | 416/114 X |
| 3,952,546 | 4/1976 | Nakano et al. | 416/141 X |
| 4,297,080 | 10/1981 | Krauss et al. | 416/114 X |
| 4,323,332 | 4/1982 | Fradenburgh | 416/134 A |
| 4,326,834 | 4/1982 | Ostrowski | 416/134 A |

FOREIGN PATENT DOCUMENTS 888158 12/1943 France ................. 416/114

*Primary Examiner*—Everette A. Powell, Jr.
*Attorney, Agent, or Firm*—Gerald E. Linden

[57] ABSTRACT

Centering and stabilizing against rotation of a helicopter swashplate stationary ring are provided by spokes that are attached between the airframe and the stationary ring. When the swashplate tilts for cyclic control, the spokes bend and twist. When the swashplate translates for collective control, the spokes are required to lengthen and skew with respect to the swashplate. An elastomeric bearing having a cylindrical component to allow for skew and a shear pad to allow for lengthening attaches each spoke to the swashplate. The invention eliminates the need for the ball joint, standpipe and scissors associated with traditional swashplate centering techniques.

3 Claims, 9 Drawing Figures

FLEXIBLE SWASHPLATE CENTERING MEMBER

BACKGROUND OF THE INVENTION

Blade pitch control in a helicopter main rotor is typically achieved by a swashplate having a stationary and a rotating ring with a bearing therebetween. The rotating ring is coupled to pitch horns on the rotor blades. The stationary ring is coupled to actuators that respond to pilot or automatic flight system inputs. Collective control is achieved by translating the swashplate up and down with respect to the rotorshaft and cyclic control is achieved by tilting the swashplate relative to the rotorshaft. To this end, the stationary ring is centered about the rotorshaft by a ball joint that allows for tilt and a standpipe that allows for translation, both of which are coaxial with the rotorshaft. A scissors linkage is attached at one end to the airframe and at the other end to the stationary ring to prevent rotation thereof.

DISCLOSURE OF THE INVENTION

It is an object of this invention to provide for swashplate centering without the ball joint, standpipe and the scissors linkage, thereby reducing cost, weight, complexity and the clearance between the rotor and the gearbox.

According to the invention, the stationary swashplate ring is centered and supported about the rotorshaft by a flexible swashplate centering member. In one embodiment, the centering member is like a spoked wheel attached by its rim to the stationary ring of the swashplate and by its hub to the gearbox (airframe stationary component). Flexible spokes that bend and twist allow for swashplate translation and tilt. However, swashplate translation also requires the spokes both to lengthen and to skew at the point of connection to the swashplate. Therefore, an elastomeric bearing having a shear pad to allow for lengthening and a cylindrical component to allow for skew is provided at the outer ends of the spokes.

In another embodiment, the centering member is external to the swashplate. Thus, the spokes attach at their outer (rim) end to the airframe stationary component and attach at their inner (hub) end to the stationary swashplate ring. In either embodiment, the critical feature is the elastomeric bearing that allows for spoke lengthening and skewing.

Other objects, features and advantages of the invention will become apparent in light of the following description thereof.

BEST MODE FOR CARRYING OUT THE INVENTION

Figure 1:
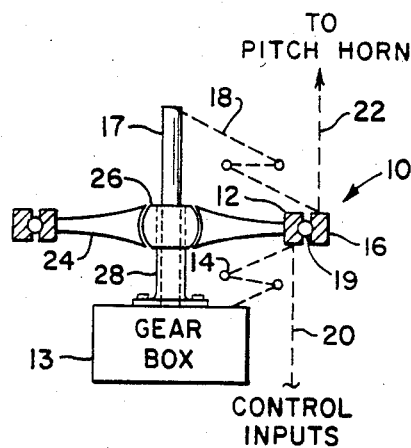
FIG. 1 is a schematic side view of prior art swashplate control.

In the prior art, as shown in FIG. 1, a swashplate 10 has an inner ring 12 held stationary to a gear box 13 by a scissors link 14 and an outer ring 16 that is rotated with a rotorshaft 17 by a scissors link 18. The outer ring 16 is journaled to the inner ring 12. The inner ring 12 is responsive via linkages and actuators 20 to pilot or automatic control inputs. The outer ring 16 is connected via linkages 22 to individual blade pitch horns to move those aerodynamic surfaces in response to the control inputs.

A rigid arm 24 is attached at its outer end periphery of the inner ring 12 and at its inner end to a ball joint 26 that is free to slide on a standpipe 28 that encircles the rotorshaft 17. This enables the swashplate 10 to translate up and down and to tilt with respect to the rotorshaft 17 for collective and cyclic control, respectively, while remaining centered thereabout.

Figure 2:
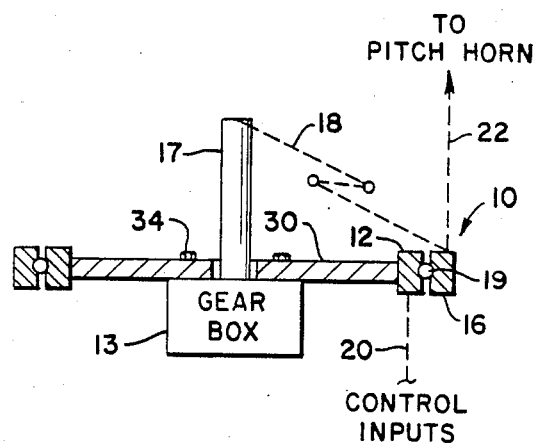
FIG. 2 is a schematic side view showing the flexible swashplate centering member of this invention.

With the present invention, as shown in FIG. 2, there is no need for the stationary scissors 14, the ball joint 26 or the standpipe 28. Instead, a flexible swashplate centering member 30 holds the inner ring 12 stationary against rotation, while allowing for translation and tilt thereof. Best viewed in the top view of FIG. 3, the centering member 30 has an inner hub 32 that attaches via suitable fasteners 34 to the gear box 13. Eminating radially from the hub 32 are flat spokes 36 that attach either directly, or via an intermediate rim 38, to the inner ring 12.

Figure 3:
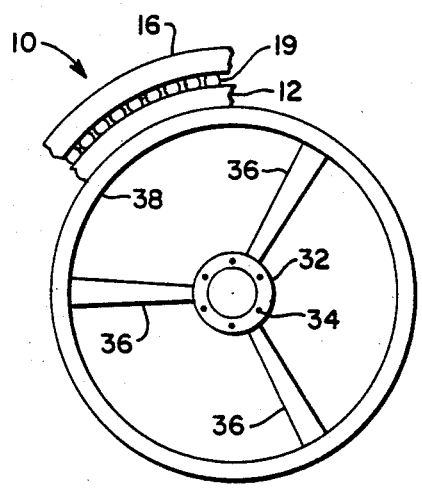
FIG. 3 is a top view of the centering member of FIG. 2.
Figure 3A:
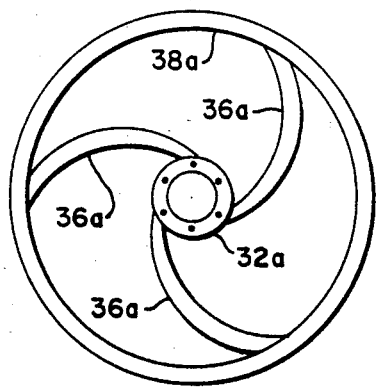
FIG. 3a is a top view of an alternate embodiment for the flexible swashplate centering member of this invention.

An essential characteristic of the spokes 36 is that they are flexible in a flatwise bending mode made that allows for translation of the swashplate. To this end it is desirable that the spokes 36 be as long as possible. Therefore, in FIG. 3a is shown an alternate embodiment of the centering member 30a wherein the spokes 36a are tangent to the hub 32a and spiral towards the rim 38a, thereby allowing for longer, more flexible spokes in the same space.

Figure 4:
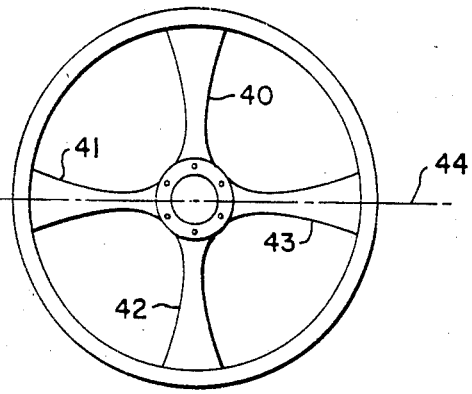
FIG. 4 is a top view of an alternate embodiment for the flexible swashplate centering member of this invention.

When the swashplate tilts, the spokes 36 (FIG. 2) are subjected to bending and twisting moments. Therefore, they must be torsionally soft along their lengths as well as flexible in the flatwise bending mode. Consider the case, in FIG. 4, of four spokes 40–43. When the swashplate tilts about an imaginary axis 44 so that the spoke 40 is bent into the page (as viewed) and the spoke 42 is bent out of the page, the on-axis spokes 41 and 43 are twisted rather than bent. This is true for three spokes as well as four—the spokes are subjected to twisting and bending in response to swashplate tilt.

Figure 5:
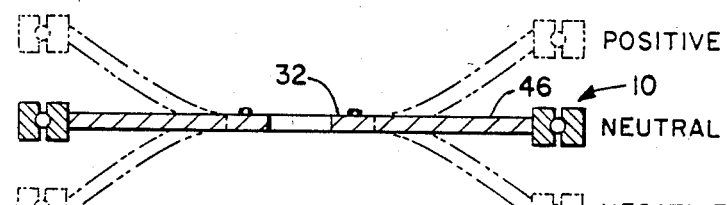
FIG. 5 is a pictogram illustrating the requirement for the spokes of the flexible swashplate centering member of this invention to lengthen and skew.

With reference to the pictogram of FIG. 5, consider the effect on a spoke 46 when the swashplate translates from a neutral position. Since the hub end of the spoke 46 is fixed relative to the swashplate, it must bend, as shown by dashed lines, to accommodate either positive or negative swashplate translation. Since the swashplate 10 remains centered during translation and does not follow a curved path, swashplate translation requires the spoke 46 both to lengthen and to skew, or change its angle, with respect to the swashplate at the point of attachment thereto. These tendencies are not present in the prior art (FIG. 1) since the standpipe 28 allows the arm 24 to follow swashplate translation.

Figure 6:
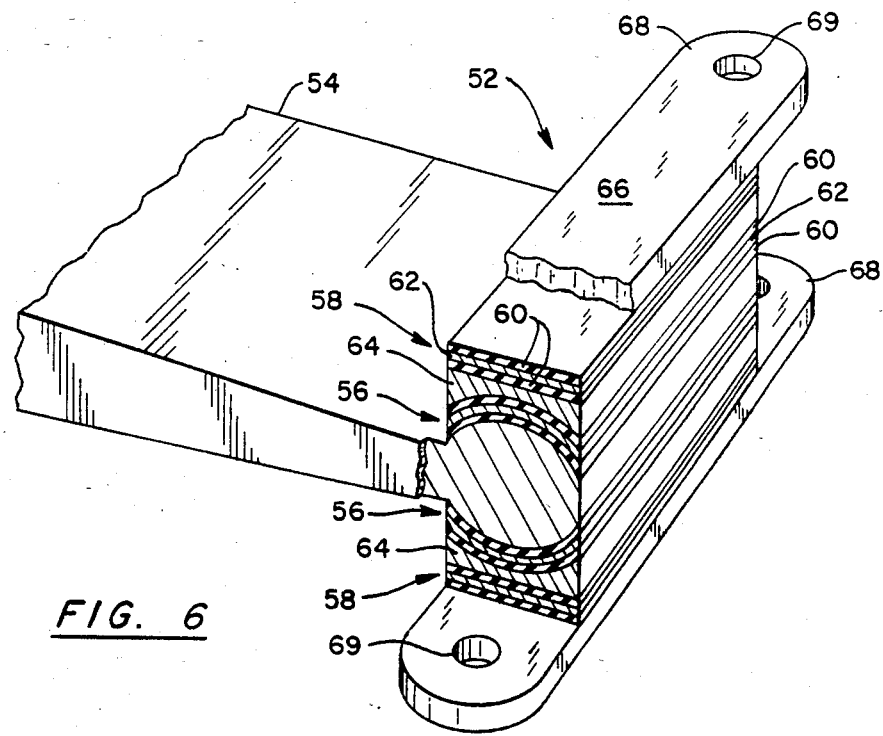
FIG. 6 is a perspective view of the elastomeric bearing that allows the spokes of the flexible swashplate centering member of this invention to lengthen and skew.

As shown in FIG. 6, a bearing arrangement 52 is provided at the outer end of each spoke 54, corresponding to the aforementioned spokes 36, 36a, 40–43, and 46, to accommodate the aforementioned lengthening and skewing that must accompany swashplate translation. A cylindrical bearing component 56 is disposed across the outer end of the spoke 54 to accommodate skewing. A shear pad component 58 is also disposed at the end of the spoke 54 to accommodate lengthening. Both the cylindrical component 56 and the shear pad component 58 are elastomeric bearings having layers 60 of elastomer and shims 62 therebetween. The number of elastomer layers is not limited to TWO—it could be more, or even ONE, in which case there would be no shims.

The inner race of the cylindrical component 56 is shown as a molded, integral part of the spoke 54. This is conveniently achieved by fabricating the spoke from "composite" materials, such as KEVLAR ® or graphite-epoxy which also have structural characteristics conducive to the soft bending and twisting required of the spoke 54. The outer race of the cylindrical component 56 comprises two spaces 64 which are concave on a side facing the cylindrical component 56. The other side of each spacer 64 is flat and forms one end piece for a respective shear pad component 58. The other end piece 66 of each shear pad component 58 is also flat towards the elastomer 60 and is made to provide for attachment in a suitable manner, such as by flanges 68 to the rim 38 (FIG. 3). Both the spacers 64 and the end pieces 66 are conveniently manufactured from composite materials.

It should be understood that the shear pad components 58 could be inside of the cylindrical component 56 rather than outside, as shown. Furthermore, the shear pad component 58 need not be at the outer end of the spoke 54, but could be located elsewhere along its length. However, the cylindrical components 56 are preferably located at the outer end of the spoke 54 where skewing occurs, and need not be elastomeric, but could be a conventional, metallic bushing.

Figure 7:
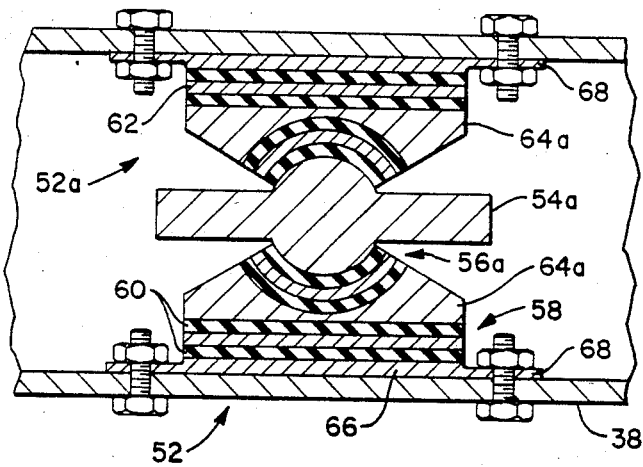
FIG. 7 is an endwise view of an alternate configuration for the elastomeric bearing such as discussed relative to FIG. 6.

In FIG. 7 is shown another bearing arrangement 52a, as viewed endwise. A spoke 54a terminates in a spherical inner race for a bearing 56a that allows not only for skewing, but also relieves the torsional strain on the spoke 54a associated with tilt. Spacers 64a form the outer race of the bearing 56a and one endpiece of the snubber bearing 62 that allows for lengthening. Endpieces 66 are the same as shown in FIG. 6 and the spoke/bearing arrangement is shown bolted inside of the rim 38.

It is known that elastomeric bearings function well with precompression. Therefore, the flanges 68 are shown with the bolt holes 69 of one flange facing the bolt holes of the other flange to indicate the possibility of compressively preloading the bearing arrangement 52 in conjunction with mounting it to the stationary ring.

Figure 8:
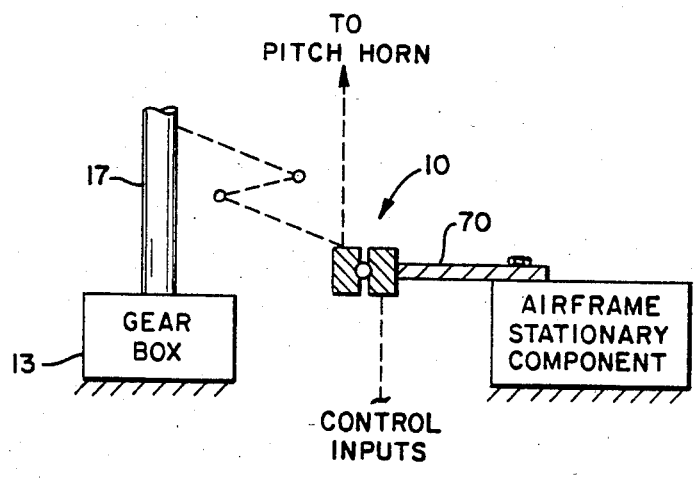
FIG. 8 is a schematic side view showing an alternate embodiment of the invention.

As stated previously, the spokes could attach directly to the swashplate, via the bearing, without the rim. Similarly, it should be understood that the spokes could attach to the gear box, or any other nonrotating (stationary) airframe component, directly at their other ends—thereby eliminating the hub. If either the hub, rim, or both are provided, they may be fabricated from composite materials and may even be unitary with the spokes. Another variation would be to provide a flexible centering member that is disposed around, rather than within the swashplate and having the outer swashplate ring be the stationary ring, as shown in FIG. 8. This would allow for a very small diameter swashplate. Again, the spokes 70 could be used with or without a rim and hub. A bearing allowing for lenghtening and skewing would still be required.

The edgewise stiffness and compressive lengthwise tensile and compressive stiffness (rather than lengthwise torsional stiffness, as discussed hereinbefore) need to be controlled to insure centering, but are not particularly germane to this invention. In any case, the ability of the centering member to restrain the swashplate stationary ring from rotation is not compromised by the bearing arrangement 52, 52a. The invention has been shown and described with respect to embodiments thereof. It should be understood that various changes could be made therein and thereto withouts departing from the spirit and scope of the invention.

What is claimed is:

1. A centering member attaching the stationary ring of a helicopter swashplate concentrically about the rotorshaft to the airframe, comprising:
    flexible elongated members disposed radially to the rotorshaft, each attached at one end to the airframe; and
    attachment means for attaching the other end of each elongated member articuably and elongatably to the stationary ring.

2. A centering member according to claim 1, wherein each attachment means comprises:
    a laminated elastomeric shear pad allowing for elongation of the attachment means in response to swashplate translation; and
    a cylindrical bearing allowing for skewing of the elongated member relative to the swashplate in response to swashplate translation.

3. A centering member according to claim 1, wherein each attachment means comprises:
    a laminated elastomeric shear pad allowing for elongation of the attachment means in response to swashplate translation; and
    a spherical bearing allowing for skewing of the elongated member relative to the swashplate in response to swashplate translation and twisting of the elongated member relative to the swashplate in response to swashplate tilt.

* * * * *